(12) United States Patent
Horen et al.

(10) Patent No.: US 7,849,194 B2
(45) Date of Patent: *Dec. 7, 2010

(54) FILE SYSTEM AND METHOD FOR ADMINISTRATING STORAGE SPACE AND BANDWIDTH IN A COMPUTER SYSTEM SERVING MEDIA ASSETS

(75) Inventors: Robert S. Horen, Pleasanton, CA (US); Sanjay Singal, Mountain View, CA (US)

(73) Assignee: Kasenna, Inc., Sunnyvale, CA (US)

( * ) Notice: Subject to any disclaimer, the term of this patent is extended or adjusted under 35 U.S.C. 154(b) by 758 days.

This patent is subject to a terminal disclaimer.

(21) Appl. No.: 11/801,997

(22) Filed: May 11, 2007

(65) Prior Publication Data

US 2008/0016220 A1 Jan. 17, 2008

Related U.S. Application Data

(62) Division of application No. 09/916,655, filed on Jul. 27, 2001, now Pat. No. 7,277,956.

(60) Provisional application No. 60/221,593, filed on Jul. 28, 2000.

(51) Int. Cl.
*G06F 15/173* (2006.01)

(52) U.S. Cl. ........................ 709/226; 709/231; 709/232; 709/233

(58) Field of Classification Search ................. 709/226, 709/231, 232, 233
See application file for complete search history.

(56) References Cited

U.S. PATENT DOCUMENTS 1,868,601 A 7/1932 Harris
2,839,185 A 6/1958 Isaacs (Continued)

FOREIGN PATENT DOCUMENTS

JP 10-294493 11/1998

OTHER PUBLICATIONS

Ackermann, P., "Direct manipulation of temporal structures in a multimedia application framework", Proc. 2nd ACM Intl Conf on Multimedia. 1994 (pp. 51-58).

(Continued)

*Primary Examiner*—John Follansbee
*Assistant Examiner*—Nghi V Tran
(74) *Attorney, Agent, or Firm*—Michael Haynes PLLC; Michael N. Haynes

(57) ABSTRACT

Method, computer program product and server computer system for use in a client server computer architecture. The server sends media assets over computer network to client computer and maintains file system organized into plurality of asset groups, each asset group comprising plurality of media assets, wherein media assets share storage medium bandwidth and storage space on server computer that is reserved for asset group to which plurality of media assets belong. An asset group placement policy module is provided that evaluates attributes of asset group to determine optimal placement of asset group within the file system of server computer system, avoiding replication of assets and spreading asset group across multiple file systems wherever possible. A media asset placement policy module is provided that evaluates asset bandwidth to determine optimal placement for asset and available resources and use this evaluation to distribute media assets within asset groups.

14 Claims, 6 Drawing Sheets

U.S. PATENT DOCUMENTS

| | | | |
|---|---|---|---|
| 4,161,075 A | 7/1979 | Eubanks et al. | |
| 4,258,843 A | 3/1981 | Wymer | |
| 4,437,618 A | 3/1984 | Boyle | |
| 5,202,961 A | 4/1993 | Mills et al. | |
| 5,247,676 A | 9/1993 | Ozur et al. | |
| 5,253,275 A | 10/1993 | Yurt et al. | |
| 5,263,165 A | 11/1993 | Janis | |
| 5,263,625 A | 11/1993 | Saito | |
| 5,267,351 A | 11/1993 | Reber et al. | |
| 5,276,861 A | 1/1994 | Howarth | |
| 5,276,876 A | 1/1994 | Coleman et al. | |
| 5,317,568 A | 5/1994 | Bixby et al. | |
| 5,325,297 A | 6/1994 | Bird et al. | |
| 5,341,477 A | 8/1994 | Pitkin et al. | |
| 5,369,570 A | 11/1994 | Parad | |
| 5,388,264 A | 2/1995 | Tobias, II et al. | |
| 5,390,138 A | 2/1995 | Milne et al. | |
| 5,392,432 A | 2/1995 | Engelstad et al. | |
| 5,414,455 A | 5/1995 | Hooper et al. | |
| 5,430,876 A | 7/1995 | Schreiber et al. | |
| 5,434,678 A | 7/1995 | Abecassis | |
| 5,442,390 A | 8/1995 | Hooper et al. | |
| 5,442,791 A | 8/1995 | Wrabetz et al. | |
| 5,446,901 A | 8/1995 | Owicki et al. | |
| 5,455,932 A | 10/1995 | Major et al. | |
| 5,459,871 A | 10/1995 | Van Den Berg | |
| 5,461,611 A | 10/1995 | Drake, Jr. et al. | |
| 5,467,288 A | 11/1995 | Fasciano et al. | |
| 5,475,819 A | 12/1995 | Miller et al. | |
| 5,485,611 A | 1/1996 | Astle | |
| 5,485,613 A | 1/1996 | Engelstad et al. | |
| 5,491,797 A | 2/1996 | Thompson et al. | |
| 5,491,800 A | 2/1996 | Goldsmith et al. | |
| 5,515,490 A | 5/1996 | Buchanan et al. | |
| 5,519,863 A | 5/1996 | Allen et al. | |
| 5,537,528 A | 7/1996 | Takahashi et al. | |
| 5,548,723 A | 8/1996 | Pettus | |
| 5,550,965 A | 8/1996 | Gabbe et al. | |
| 5,553,221 A | 9/1996 | Reimer et al. | |
| 5,557,785 A | 9/1996 | Lacquit et al. | |
| 5,559,608 A | 9/1996 | Kunihiro | |
| 5,559,949 A | 9/1996 | Reimer et al. | |
| 5,559,955 A | 9/1996 | Dev et al. | |
| 5,561,769 A | 10/1996 | Kumar et al. | |
| 5,568,181 A | 10/1996 | Greenwood et al. | |
| 5,581,703 A | 12/1996 | Baugher et al. | |
| 5,584,006 A | 12/1996 | Reber et al. | |
| 5,586,264 A | 12/1996 | Belknap et al. | |
| 5,596,720 A | 1/1997 | Hamada et al. | |
| 5,602,582 A | 2/1997 | Wanderscheid et al. | |
| 5,602,850 A | 2/1997 | Wilkinson et al. | |
| 5,603,058 A | 2/1997 | Belknap et al. | |
| 5,623,699 A | 4/1997 | Blakeslee | |
| 5,630,067 A | 5/1997 | Kindell et al. | |
| 5,630,121 A | 5/1997 | Braden-Harder et al. | |
| 5,633,999 A | 5/1997 | Clowes et al. | |
| 5,640,388 A | 6/1997 | Woodhead et al. | |
| 5,644,715 A | 7/1997 | Baugher | |
| 5,682,597 A | 10/1997 | Ganek et al. | |
| 5,694,548 A | 12/1997 | Baugher et al. | |
| 5,701,465 A | 12/1997 | Baugher et al. | |
| 5,712,976 A | 1/1998 | Falcon, Jr. et al. | |
| 5,724,605 A | 3/1998 | Wissner | |
| 5,737,747 A | 4/1998 | Vishlitzky et al. | |
| 5,751,280 A | 5/1998 | Abbott et al. | |
| 5,758,078 A | 5/1998 | Kurita et al. | |
| 5,778,181 A | 7/1998 | Hidary et al. | |
| 5,790,795 A | 8/1998 | Hough | |
| 5,801,781 A | 9/1998 | Hiroshima et al. | |
| 5,805,821 A | 9/1998 | Saxena et al. | |
| 5,819,019 A | 10/1998 | Nelson | |
| 5,877,812 A | 3/1999 | Krause et al. | |
| 5,892,767 A | 4/1999 | Bell et al. | |
| 5,892,913 A | 4/1999 | Adiga et al. | |
| 5,920,700 A | 7/1999 | Gordon et al. | |
| 5,925,104 A | 7/1999 | Elbers et al. | |
| 5,926,649 A | 7/1999 | Ma et al. | |
| 5,928,330 A | 7/1999 | Goetz et al. | |
| 5,930,797 A | 7/1999 | Hill | |
| 5,933,849 A | 8/1999 | Srbljic et al. | |
| 5,953,506 A | 9/1999 | Kalra et al. | |
| 5,973,679 A | 10/1999 | Abbott et al. | |
| 5,996,025 A * | 11/1999 | Day et al. | 719/328 |
| 6,006,264 A | 12/1999 | Colby et al. | |
| 6,014,694 A | 1/2000 | Aharoni et al. | |
| 6,018,619 A | 1/2000 | Allard et al. | |
| 6,026,425 A | 2/2000 | Suguri et al. | |
| 6,031,960 A | 2/2000 | Lane | |
| 6,034,746 A | 3/2000 | Desai et al. | |
| 6,094,706 A | 7/2000 | Factor et al. | |
| 6,119,167 A | 9/2000 | Boyle et al. | |
| 6,131,095 A | 10/2000 | Low et al. | |
| 6,134,315 A | 10/2000 | Galvin | |
| 6,137,834 A | 10/2000 | Wine et al. | |
| 6,154,778 A | 11/2000 | Koistinen et al. | |
| 6,185,625 B1 | 2/2001 | Tso et al. | |
| 6,223,210 B1 | 4/2001 | Hickey | |
| 6,230,200 B1 | 5/2001 | Forecast et al. | |
| 6,240,243 B1 | 5/2001 | Chen et al. | |
| 6,279,040 B1 | 8/2001 | Ma et al. | |
| 6,281,524 B1 | 8/2001 | Yamamoto et al. | |
| 6,343,298 B1 | 1/2002 | Savchenko et al. | |
| 6,356,921 B1 | 3/2002 | Kumar et al. | |
| 6,377,996 B1 | 4/2002 | Lumelsky et al. | |
| 6,442,601 B1 * | 8/2002 | Gampper et al. | 709/218 |
| 6,553,413 B1 | 4/2003 | Leighton et al. | |
| 6,567,409 B1 | 5/2003 | Tozaki et al. | |
| 6,584,463 B2 | 6/2003 | Morita et al. | |
| 6,601,136 B2 | 7/2003 | Gunaseelan et al. | |
| 6,654,933 B1 | 11/2003 | Abbott et al. | |
| 6,661,430 B1 | 12/2003 | Brewer et al. | |
| 6,708,213 B1 | 3/2004 | Bommaiah et al. | |
| 6,717,591 B1 | 4/2004 | Fiveash et al. | |
| 6,728,270 B1 | 4/2004 | Meggers et al. | |
| 6,754,443 B2 | 6/2004 | Nelson et al. | |
| 6,757,736 B1 | 6/2004 | Hutchison et al. | |
| 6,771,644 B1 | 8/2004 | Brassil et al. | |
| 6,831,394 B2 | 12/2004 | Baumgartner et al. | |
| 6,868,452 B1 | 3/2005 | Eager et al. | |
| 6,963,910 B1 * | 11/2005 | Belknap et al. | 709/223 |
| 7,107,606 B2 | 9/2006 | Lee | |
| 7,125,383 B2 | 10/2006 | Hoctor et al. | |
| 2002/0010798 A1 | 1/2002 | Ben-Shaul et al. | |
| 2002/0038374 A1 | 3/2002 | Gupta et al. | |
| 2002/0040403 A1 | 4/2002 | Goldhor et al. | |
| 2002/0049846 A1 | 4/2002 | Horen et al. | |
| 2002/0065925 A1 | 5/2002 | Kenyon et al. | |
| 2002/0078203 A1 | 6/2002 | Greschler et al. | |
| 2002/0103928 A1 | 8/2002 | Singal et al. | |
| 2002/0152318 A1 | 10/2002 | Menon et al. | |
| 2002/0161868 A1 | 10/2002 | Paul et al. | |
| 2003/0018978 A1 | 1/2003 | Singal et al. | |
| 2003/0187811 A1 | 10/2003 | Chang et al. | |

OTHER PUBLICATIONS

AVID "Edge clusters: now serving a dynamic internet" www.avid.com.
AVINTi: iSolation server FAQ http://www.avinti.com/downloads/isolation-server-faq.html.
AVINTi: iSolation server v. 2 whitepaper http://www.avinti.com/downloads/isolation-server-whitepaper.html.

Bommaiah et al., "Design and implementation of a caching system for streaming media over the internet" Proc Real-Time Technology & Applications Symposium 2000 (pp. 111-121).
Brumley, D. et al. "Remote timing attacks are practical" Proc 12th Usenix Security Symposium, 2003.
Bulterman et al., "A Structure for Transportable, Dynamic Multimedia Documents", USENIX Summer '91, Jun. 1991, pp. 137-155.
Byrne, K. "Evaluating jukebox performance" *The Practical Engineer*)IEEE Spectrum Jul. 1997.
Chandra, R. et al. "The collective: a cache-based system management architecture" (2nd Symp.on Networked Sys. Design & Implementation (May 2005), Boston MA.
Chow, J. et al. "Understanding data lifetime via whole system simulation" Proc 2004 Usenix Security Symposium.
Crutcher et al., "The networked video jukebox" IEEE Transactions on Circuits & Systems for Video Tech. vol. 4 No. 2, Apr. 1994.
Eitel, P. "Backup and storage management in distributed heterogeneous environments" 13th IEEE Symp. on Mass Storage Systems (1994) pp. 124-125.
Elrad, T. et al. "Developing secure applications through aspect-oriented programming" Addison-Wesley (Sample chapter from *Aspect Oriented Software Development* Nov. 2004.
Fan, et al, Sumary cache: a scalable wide-area web cache sharing protocol Technical Report 1361, Dept Computer Science, Univ Wisconsin-Madison, Feb 1998.
Ford, D. et al. "Redundant arrays of independent libraries (RAIL): a tertiary storage system" 1996 IEEE Proc. of COMPCON '96 (pp. 280-285).
Garfinkel, T. et al. "Flexible OS support and appliations for trusted computing". Stanford Univ. Dept of Computer Science http://suif.stanford.edu/papers/trusted-hotos03.pdf.
Garfinkel, T. Ostia: a delegating architecture for secure system call interposition Stanford Univ. Dept. of Computer Science http://www.stanford.edu/~blp/papers/ostia.pdf.
Garfinkel, T. "Traps and pitfalls: practical problems in system call interposition based security tools" Stanford Univ. Dept of Computer Science http://www.stanford.edu/~talg/papers/traps/traps-ndss03.pdf.
Garfinkel, T. "Terra: a virtual machine-based platform for trusted computing" Stanford Univ. Dept. of Computer Science http://suif.stanford.edu/papers/sosp03-terra.pdf.
Garfinkel, T. "A virtual machine introspection based architecture for intrusion detection" Stanford Univ. Dept. of Computer Science http://suif.stanford.edu/papers/vmi-ndss03.pdf.
GreenBorder: About Us. http://www.greenborder.com/about/ (Jan. 2006).
GreenBorder offers security 'barrier' for IE, Outlook (Computerworld) Mar. 2005.
Grizzard, J. et al. "Towards an approach for automatically repairing compromised network systems"; Network Computing and Applications, 2004. (NCA 2004). Proceedings. Third IEEE International Symposium (Aug.-1 Sep. 2004) pp. 389-382.
Gruber et al., "Protocol considerations for a prefix-caching proxy for multimedia streams" Computer Networks 33, pp. 657-668 (2000).
Hamakawa, R. et al. "Object composition and playback models for handling multimedia data" Springer-Verlag New York, Inc. (1994).
Hirzalla, N. et al. "A temporal model for interactive multimedia scenarios", IEEE MultiMedia, 1995 (pp. 24-31).
Jun, S. et al. "Video allocation methods in a multi-level server for large-scale VOD services" 1998 IEEE.
Little, "Interval-based conceptual models for time-dependent multimedia data", IEEE Transactions on Knowledge and Data Engineering, 5(4): 551-563 (1993).
Li, N. et al. "Oblivious signature-based envelope" *Proceedings of the 22nd ACM Symposium on Principles of Distributed Computing (PODC 2003)*, Boston, Massachusetts, Jul. 2003.
Ludescher, C. et al. "File storage management for TFTR physics data" 1992 IEEE (pp. 856-859).
Microsoft TechNet "Server and domain isolation using IPsec and group policy" (Mar. 2005).

nCube: N4 Streaming Media System http://www.ncube.com (Nov. 2000).
Nelson et al., MediaBase: Streaming Media Serving for the Web, pp. 1-28 (1997).
Nelson et al. "A highly available, scalable ITV system" Assoc. For Comp. Mach. (ACM) 1995.
Oracle9i Real application clusters:cache fusion delivers scalability. Oracle White Paper (May 2001).
Pratt et al. "Arsenic: a user-accessible gigabit ethernet interface". Proc. IEEE Infocom (2001).
Rajae et al., "Multimedia proxy caching mechanism for quality adaptive streaming applications in the internet" IEEE Infocom 2000 (pp. 980-989).
RealNetworks Documentation Library. http://service.real.com/help.library/earlier.html (Dec. 2004).
RealNetworks, "RealServer Administration Guide," Dec. 13, 1999, http://service.real.com/help/library/guides/g270/realsvr.htm, Ch. 13, 14.
RealNetworks, "RealSystem 8.0x and earlier Production &Authoring Guides." http://service.real.com/help/library/earlier.htm.
RealNetworks, "RealSystem G2 Production Guide," Mar. 22, 2000, http://service.real.com/help/library/guides/productiong27/realpgd.htm, Ch. 3,7.
Rexford, J. "A smoothing proxy service for variable bit-rate streaming video". Global Telecommunications Conf.-Globecom'99 (pp. 1823-1829) Sapuntzakis, C. et al.
Rothermel, K. "QoS negotiation and resource reservations for distributed multimedia applications" Proc IEEE Intl Conf on Multimedia Computing & Systems Jun. 1997 (pp. 319-326).
Ruwase, O. "A practical dynamic buffer overflow detector". Stanford Univ. 2004.
Sapuntzakis, C. et al., "Optimizing the migration of virtual computers" Stanford Univ (also, Proc 5th Op Sys Design and Implementation, Boston, MA, Dec. 2002).
Sapuntzakis, C. et al.,"Virtual appliances for deploying and maintaining software" Stanford Univ. Computer Systems Lab. 2003.
Schmidt, B. "Supporting ubiquitous computing with stateless consoles and computation caches". Stanford University Aug. 2000.
Schmidt, B. et al. "The interactive performance fo SLIM: a stateless, thin-client architecture" Op. Syst. Rev. 34(5):32-47, Dec. 1999.
SeaChange Media Cluster "New paradigm for digital video storage and delivery" whitepaper. Aug. 2002. www.seachangeinternational.com/downloads/broadcast/mediacluster/mediacluster%.
Sen, S. "Proxy prefix caching for multimedia streams" IEEE 1999.
StreamWorks Server, May 8, 1997.
Shenchang, E. "An image-basead approach to virtual environment navigation" Proc. SIGGRAPH 95 (pp. 29-38) 1995.
WebTheater 2 Product Datasheet, 1997.
WebForce Media Server, Aug. 15, 1996.
WebForce MediaBase—Mediabase 2.0 Brochure, 1997.
Wessels, D. et al., Internet Cache Protocol (ICP), v.2, Sep. 1997.
Yoshida, J., "MIPS Magic Carpet Takes Set-Top-Box Ride", EE Times, May 1995.
Zhang, et al., "RSVP: a new resource reservation protocol", IEEE Network, vol. 7, No. 5, pp. 8-18, (Sep. 1993).
Zeichik, Isolation and protection: Intel's lagrande vision for trusted virtualization, Nov. 2005. http://222.devx.com/Intel/Article/30008.
Stanford Collective Group: A virtual appliance computing infrastructure. Jan 2006. http://suif.stanford.edu/collective/index.html.
RealNetworks, "Realsystem 8.0x and earlier Production &Authoring Guides." http://service.real.com/help/library/earlier.htm.
RealNetworks, "RealServer Administration Guide," Dec. 13, 1999, http://service.real.com/help/library/guides/g270/realsvr.htm, chapters 13 and 14.
RealNetworks, "RealSystem G2 Production Guide," Mar. 22, 2000, http://service.real.com/help/library/guides/productiong27/realpgd.htm, chapters 3 and 7.

* cited by examiner

| COURSE | BIT RATE | 1(20) | 2(20) | 3(16) | 4(16) | 5(12) | 6(12) | 7(8) | 8(8) | 9(4) | 1(4) |
|---|---|---|---|---|---|---|---|---|---|---|---|
| CS101 | 1.5Mbps | 50 | 45 | 40 | 35 | 30 | 25 | 20 | 15 | 10 | 5 |
| CS101i | 200kbps | 50 | 45 | 40 | 35 | 30 | 25 | 20 | 15 | 10 | 5 |
| MA101 | 1.5Mbps | 50 | 45 | 40 | 35 | 30 | 25 | 20 | 15 | 10 | 5 |
| MA101i | 200kbps | 50 | 45 | 40 | 35 | 30 | 25 | 20 | 15 | 10 | 5 |
| CH101 | 1.5Mbps | 50 | 45 | 40 | 35 | 30 | 25 | 20 | 15 | 10 | 5 |
| CH101i | 200kbps | 50 | 45 | 40 | 35 | 30 | 25 | 20 | 15 | 10 | 5 |

FIG. 5

FILE SYSTEM AND METHOD FOR ADMINISTRATING STORAGE SPACE AND BANDWIDTH IN A COMPUTER SYSTEM SERVING MEDIA ASSETS

RELATED APPLICATIONS

This application is a divisional of U.S. application Ser. No. 09/916,655, filed Jul. 27, 2001, which application claims benefit to U.S. Provisional Patent Application Ser. No. 60/221,593, filed Jul. 28, 2000, which applications are incorporated herein by reference.

FIELD OF THE INVENTION

The present invention relates broadly to distributed computer systems. More specifically, the present invention relates to organizing content into asset groups to optimize delivery to users in a distributed computer system.

BACKGROUND OF THE INVENTION

In a computer system serving media assets to multiple users, such as a server farm having significant mass storage in the form of magnetic and optical disks and providing content to users of client computers over a global computer network, a value indicating a guaranteed number of plays is an attribute associated with each media asset. This attribute is used to reserve storage bandwidth so that at any given time, a certain number of simultaneous playouts are available for the requested media asset. For file systems containing the media assets and as referred to herein, storage bandwidth refers to the transmission bandwidth available for transfer of media assets stored on the server computer over a communications medium, such as a network connection. For example, the storage bandwidth for one media asset doubles when it two media assets of the same size are played out simultaneously. A media asset can for example be audio, text, graphics, image, symbol, video, or other information item or token or communication item or method by which information such as audio or visual content is conveyed to a user. As referred to herein, "playout" refers to the streaming or other transfer of the media asset from a server computer to a client computer on which a user views or listens to the media asset. Additionally, the guaranteed number of plays attribute is used to determine the number of copies of the asset required to satisfy the guaranteed number of plays. However, there are limitations associated with utilization of this attribute. As shown in FIG. 1, a significant amount of storage space is wasted with respect to the storage bandwidth utilized for playouts of the ten media assets.

FIG. 1 illustrates utilization of storage space on a server versus storage bandwidth as utilized in conventional media asset delivery systems. In FIG. 1, a user desires a maximum of ten playouts from a set of ten 1 Mbps assets, each of which occupies ten MB of storage space. These playouts could all be from the same asset or from any combination thereof, although the total number of playouts is less than or equal to the ten playouts desired by the user. Typical implementations install each of these assets with ten guaranteed playouts. If these assets are all placed on a single file system with a bandwidth capacity of 100 Mbps and space capacity of 1 GB, then the entire file system bandwidth is consumed and the file system is no longer usable for further asset installations even though only 100 MB of disk space has been used. This is wasteful in terms of file system bandwidth and space.

SUMMARY

The present invention solves the problems discussed above by providing a method, computer program product and server computer system for use in a client server computer architecture. The server sends media assets over a computer network to a client computer and maintains a file system organized into a plurality of asset groups, each asset group comprising a plurality of media assets, wherein the media assets share storage medium bandwidth and storage space on the server computer that is reserved for the asset group to which the plurality of media assets belong.

Attributes are associated with each asset group, and can include a value indicating the number of maximum simultaneous playouts for the media assets within the asset group, and the maximum bit rate at which any single media asset within the asset group can be played out, the guaranteed possible number of playouts from each asset belonging to the asset group.

An asset group placement policy module is provided that evaluates the attributes of the asset group to determine optimal placement of the asset group within the file system of the server computer system, avoiding replication of assets and spreading the asset group across multiple file systems wherever possible.

A media asset placement policy module is provided that evaluates asset bandwidth to determine the optimal placement for the asset and available resources and use this evaluation to distribute the media assets within the asset groups.

By organizing media assets into asset groups of the present invention, resources such as storage bandwidth and storage space are conserved, thus allowing a server computer system to play a greater number of media assets to clients than conventional systems of similar storage capacity and storage bandwidth.

These and many other attendant advantages of the present invention will be understood upon reading the following detailed description in conjunction with the drawings.

BRIEF DESCRIPTION OF THE DRAWINGS

FIG. 5 is a table illustrating demand for media assets in a distance learning application according to an embodiment of the present invention;

DETAILED DESCRIPTION

Figure 1:
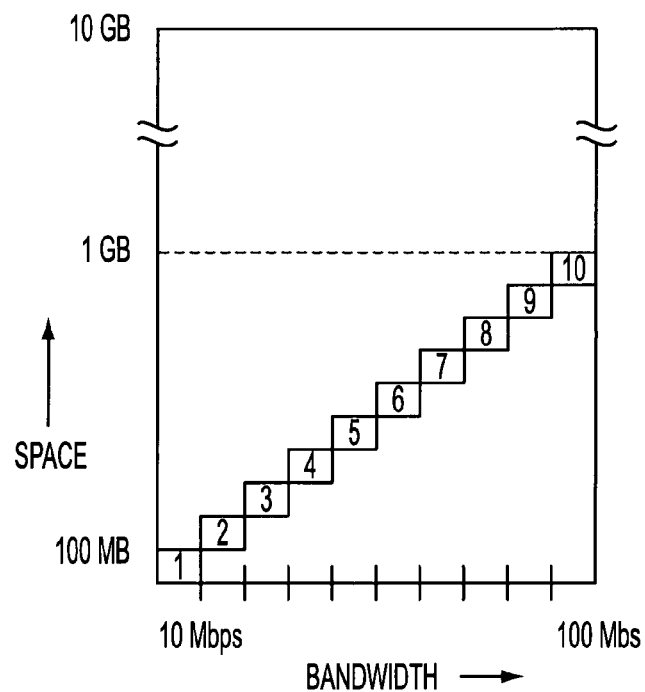
FIG. 1 is a diagram of utilization of bandwidth and storage space as used in prior art systems.
Figure 2:
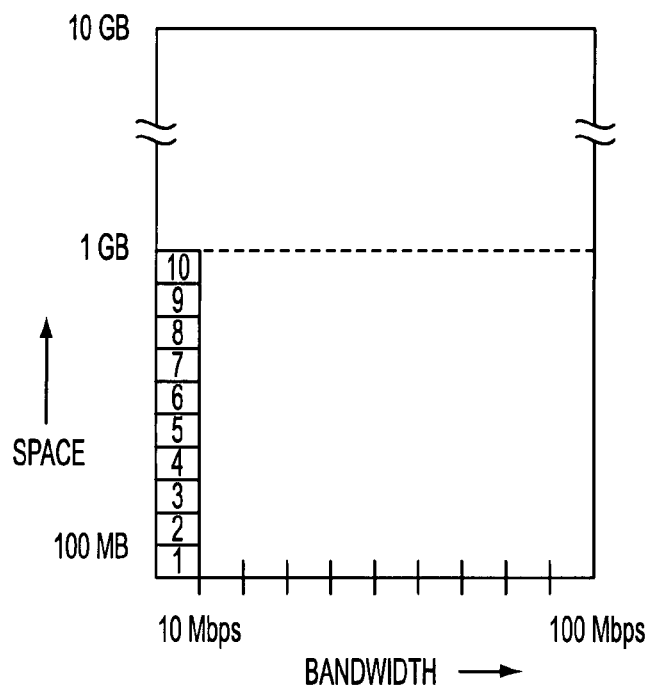
FIG. 2 is a diagram of utilization of bandwidth and storage space as used in accordance with an embodiment of the present invention.

Directing attention to FIG. 2, the present invention avoids the shortcomings of the problems discussed above and illustrated in FIG. 1 by organizing media assets into asset groups. As referred to herein, an asset group is a set of media assets (static image, video, audio, text, or combinations thereof) that can be played on a computer and which share a certain amount of system resources, such as storage space and storage bandwidth. FIG. 2 illustrates the manner in which asset groups can be used so that the storage bandwidth is more effectively used in comparison to the rapid growth or consumption of bandwidth on the conventional system and method of FIG. 1.

Figure 3:
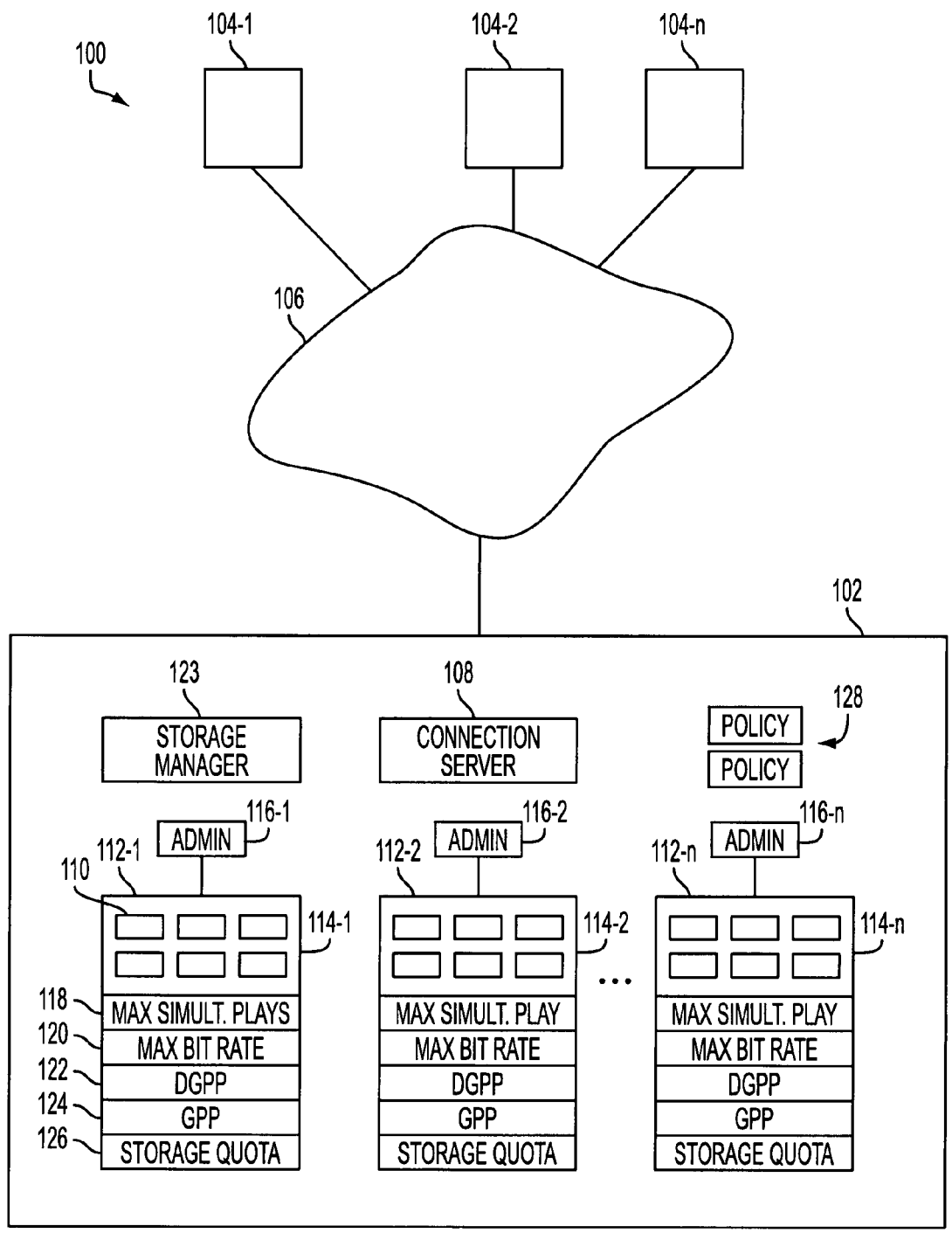
FIG. 3 is a block diagram illustrating an embodiment of the present invention as implemented in a client-server computer system implemented over a computer network.

Directing attention to FIG. 3, embodiments of the present invention utilize a client server computer architecture 100 having a server 102 connected or capable of being connected to one or more client computers 104-1, 104-2, . . . , 104-$n$, where n is the number of consumers that utilize client computer 104 to receive content from server 102 via computer network 106. In the preferred embodiment, computer network 106 is a global computer network, such as the Internet, but may also be a wide area network, such as used within a company having multiple facilities located at different geographic sites, or smaller computer networks, such as computer networks used on college campuses, local area networks, and the like.

Server 102 incorporates connection server 108, a module that resides in memory and coordinates connections between the server 102 and clients 104. Once a connection is made, the server 102 then directs the distribution of media assets 110 in response to user requests for delivery. Media assets 110 can be stored in memory and/or mass storage devices, depending on user demand and storage requirements of the individual assets. The media assets 110 are organized within file systems 112 that are configured to store the assets in asset groups 114. An asset group 114 is normally administered by a single asset group administrator 116. In an embodiment of the present invention, each asset belongs to only one asset group, thus avoiding replication of assets and more efficiently using storage space and storage bandwidth. Asset group 114 can contain other asset groups as well as other assets, much as a file directory can contain files as well as subdirectories of files. Different assets within asset group 114 can have varied bit rates. The following attributes can be associated with asset group 114: Maximum Simultaneous Plays for Asset Group (118), Maximum bit rate (120), Default Guaranteed Possible Plays (DGPP) (122), Guaranteed Possible Playouts (124) (GPP), and Resource Quota (126). Each of these attributes are described in further detail immediately below.

Maximum Simultaneous Playouts for Asset Group (118) is an attribute that indicates the maximum simultaneous playouts possible from asset group 114. Sufficient file system bandwidth is reserved at asset group creation time in order to satisfy this value.

Maximum bit rate (120) is an attribute that describes the maximum bit rate of any single asset installed within asset group 114.

Default Guaranteed Possible Playouts (DGPP) (122) is an attribute that indicates the guaranteed number of playouts possible from each asset 110 within the asset group 114 assuming no other asset is being played out at the same time. Internally, the storage manager 123 will create enough copies of assets within asset group 114 at install time to satisfy the value designated by the DGPP 122. This value can be overridden for each asset 110.

Guaranteed Possible Playouts (124) (GPP): note that if A1, A2, . . . , An are the assets within an asset group, GPP1, GPP2, . . . GPPn are the GPP attributes for these assets respectively, and b1, b2, . . . bn are the bit rates of the assets respectively, and BWAG is the bandwidth quota for asset group 114, then the following inequality holds: $GPP_i*b_i \leq BWAG$ for $I=1, 2, \ldots n$.

Resource Quota (126) is an attribute that indicates the file system resources (storage space and storage bandwidth) reserved for asset group 114. All assets within asset group 114 share the storage bandwidth, and are not played out using any asset group's bandwidth. The bandwidth component of resource quota 126 is calculated by multiplying the value of the Maximum Simultaneous Playouts for Asset Group attribute 118 by the value of the Maximum Bit Rate attribute 120. Storage space computation is slightly more involved and depends on the maximum bit rate, duration of playing assets installed within asset group 114, the DGPP value for asset group 114 and also the availability of storage space and bandwidth on currently configured file system 112. The assets 110 installed within asset group 114 may not exceed the resource quota 126 in order to preserve the reservation of resources for each asset group.

With the introduction of asset groups, two levels of placement policies are implemented. Asset group placement policy module 128 performs asset group placement based on attributes which determine the resource quota 126 for the asset group 114, and media asset placement policy module 130 performs media asset placement within the placed asset group. In order to better utilize the resource quota, avoid fragmentation of disk resources and avoid asset replication where possible, asset groups are placed in a manner that avoid distributing the quota across multiple file systems as much as possible, such as on the same disk array or physical storage device, or within the group storage devices that make up a single file system. Policy module 130 evaluates asset bandwidth to determine the optimal placement for the asset and available resources and use this evaluation to distribute the media assets within the asset groups 114. Since storage space and storage bandwidth reservation have already been performed for the asset group 114 by policy module 128 prior to asset installation, policy module 130 restricts the placement domain of the media asset to the asset group distribution of storage space and storage bandwidth.

Figure 4:
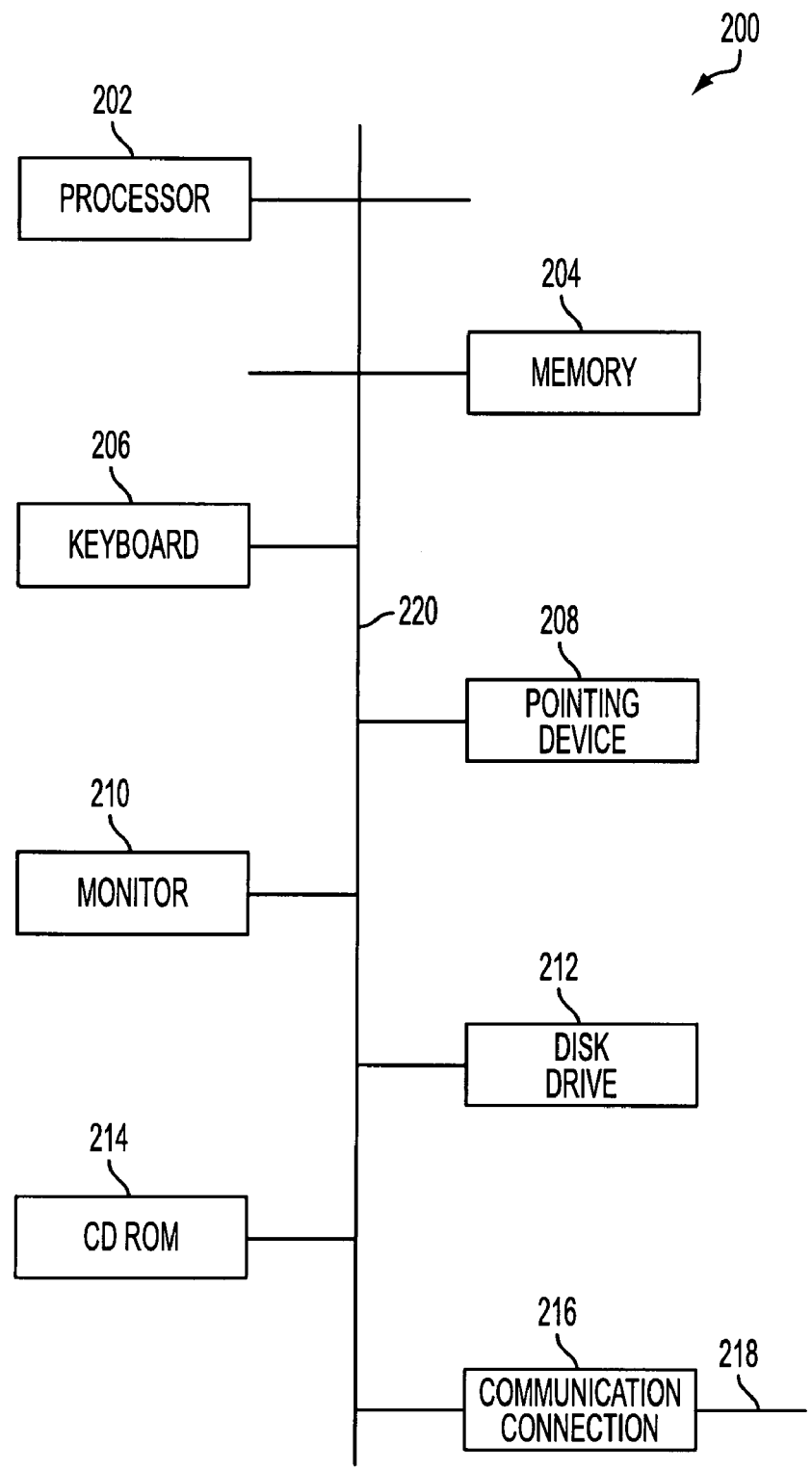
FIG. 4 is a block diagram illustrating the major components of a computer that may be used in connection with the client server system according to an embodiment of the invention.

FIG. 4 illustrates in block diagram form the major components included in a computer embodying either server 102 or client 104. Computer 200 incorporates a processor 202 utilizing a central processing unit (CPU) and supporting integrated circuitry. In the preferred embodiment, work stations such as Sun Ultra computers available from Sun Microsystems can be used as server 102. Personal computers such as available from Dell Corporation may be used for client computers 104. However, in general, any type of computer may be used for the server 102 and any type of computer may be used for client 104. Memory 204 may include RAM and NVRAM such as flash memory, to facilitate storage of software modules executed by processor 202, and file systems containing media assets. Also included in computer 200 are keyboard 206, pointing device 208, and monitor 210, which allow a user to interact with computer 200 during execution of software programs. Mass storage devices such as disk drive 212 and CD ROM 214 may also be in computer 200 to provide storage for computer programs, associated files, and media assets. In an embodiment, database products available from Oracle Corp. may be utilized in connection with file systems as a database and database server. Computer 200 communicates with other computers via communication connection 216 and communication line 218 to allow the computer 200 to be operated remotely, or utilize files stored at different locations. Communication connection 216 can be a modem, network interface card, or other device that enables a computer to communicate with other computers. Communication line 218 can be a telephone line or cable, or any medium capable of transferring data between computers. In alternative embodiments, communication connection 216 can be a wireless communication medium, thus eliminating the need for communication line 218. The components described above may be operatively connected by a communications bus 220.

Embodiments of the present invention are useful in a variety of applications where multiple media assets share a finite amount of bandwidth. Two scenarios where asset groups of the present invention provide improved file system resource utilization are described below. These examples are provided to illustrate the benefits of the present invention and are just two of many applications for which the present invention is suitable.

In an embodiment of the present invention, consider the situation of a news acquisition system as used by a major news provider such as CNN. Such a system provides asset playout access to a maximum of approximately 300 journalists. Assets are captured using a set of 40 encoders. Assets being captured (and stored in asset groups) comprise breaking news items. For illustrative purposes it is assumed that during a typical network load ten viewers access a given news item simultaneously. There can be multiple stories (up to 40 in this scenario, limited by the number of encoders) being captured at any given time. Additionally, there can be numerous old stories stored on the system.

According to one embodiment, an asset group is defined with the following attributes: (a) Maximum number of simultaneous playouts for asset group=300, (b) Maximum bit rate of assets installed=1.5 Mbps, (c) Default Guaranteed Possible Playouts=10. Given these attributes and values, the bandwidth component of the resource quota for the asset group is determined to be 450 Mbps. In the case of three available file systems: F1, having 300 Mbps of storage bandwidth and 60 GB of storage space; F2 having 150 Mbps of storage bandwidth and 30 GB of storage space; and F3, having 120 Mbps of storage bandwidth and 60 GB of storage space, an asset group can be created by the asset group placement policy 128 with the following distribution: ((F1, 250 Mbps, 50 GB), (F2, 100 Mbps, 20 GB), (F3, 100 Mbps, 50 GB)). Since the DGPP is 10, the maximum bit rate allowed for any single asset is 15 Mbps. This means that asset replication can be completely avoided. If the length of each news story is 90 minutes (which equates to about 1.0125 GB) this asset group can accommodate a total of about 175 hours of news stories or 117 news stories.

Contrast the embodiment of the present invention described immediately above with an implementation of a conventional system. If the media assets were installed individually on this system with guaranteed playouts=10, the total number of assets installed on the entire system could not have exceeded 570 Mbps, which is the combined bit rates for file systems F1, F2, and F3, divided by 15 Mbps, which is the maximum bit rate for any single asset. 570 Mbps divided by 15 Mbps yields 38 news stories. By forming an asset group, 117 news stories, nearly triple the amount of media assets allowed by conventional systems, may be accommodated using only a fraction of the file system resources.

In another embodiment of the present invention, consider the example of a university which would like to offer lecture notes for three courses to be viewed by two kinds of students: (a) students on campus who have access to the high-speed campus backbone and can view assets at 1.5 Mbps, and (b) students accessing the lecture notes over the Internet and thus limited to about 200 kbps. Further, the university provides lecture notes for the past ten weeks on a sliding window basis. Lecture notes for the current week are likely to be the most in demand, while those for the previous weeks are less in demand. The demand table to ten weeks is shown in the table in FIG. 5. The first column indicates the course name, the second the bit rate of assets available for that course (the "i" suffix for the course name indicates an Internet offering). The next ten columns indicate the maximum possible number of students who can access the course offerings for that particular week. For example, during the first week a maximum of fifty students can access the lecture notes for MA101, and during the seventh week a maximum of twenty students can access the lecture notes for CH101i. In addition, the number in parentheses "( )" next to the week number indicates the maximum number of simultaneous accesses for each individual lecture in the week. There are five sets of lecture notes stored for each week in each category. This example is ideal again for the illustration of the effectiveness of asset groups. The lecture notes administrator can create separate asset groups for the lecture notes of each course offering each week for each kind of bit rate. In this example, this means that there is a total of 60 asset groups, determined by each course having an asset group for the lecture notes for each week of the course. Half of these asset groups are assumed to have a maximum bit rate of 1.5 Mbps, the other half 200 kbps. The asset group for the lecture notes for the campus-access version of CS101 for week one would have the following attributes: (a) Maximum Simultaneous Playouts for Asset Group=50, (b) DGPP=20, and (c) Maximum Bit Rate for Assets Installed in Asset Group=1.5 Mbps. Let us further assume that each lecture is 60 minutes in duration.

System bandwidth and space requirements are now addressed. For this exemplary computation it is assumed that each lecture is 60 minutes in duration. Assuming no replication is needed (for simplicity, but not limiting the scope of the invention), the file system bandwidth and space requirement for this kind of a setup are as follows:

Week 1:

$$50*1.5 \text{ Mbps}*3 \text{ courses}+50*0.2 \text{ Mbps}*3 \text{ courses}=255 \text{ Mbps bandwidth, and}$$

$$(5*60*60*1.5 \text{ Mbps}*3 \text{ courses}+5*60*60*0.2 \text{ Mbps}*3 \text{ courses})/8=11.475 \text{ GB}$$

If on the other hand, asset groups were not used and individual assets were installed, the following would have been the resource requirements:

Week 1:

$$5*20*1.5*3+5*20*0.2*3=510 \text{ Mbps bandwidth.}$$

The storage space is the same:

$$(5*60*60*1.5 \text{ Mbps}*3 \text{ courses}+5*60*60*0.2 \text{ Mbps}*3 \text{ courses})/8=11.475 \text{ GB}$$

Thus, the present invention reduces the bandwidth requirement by 50%, from 510 Mbps to 255 Mbps. Note that the space calculation here assumes that no space is wasted due to unavailability of bandwidth on certain disks.

Figure 6:
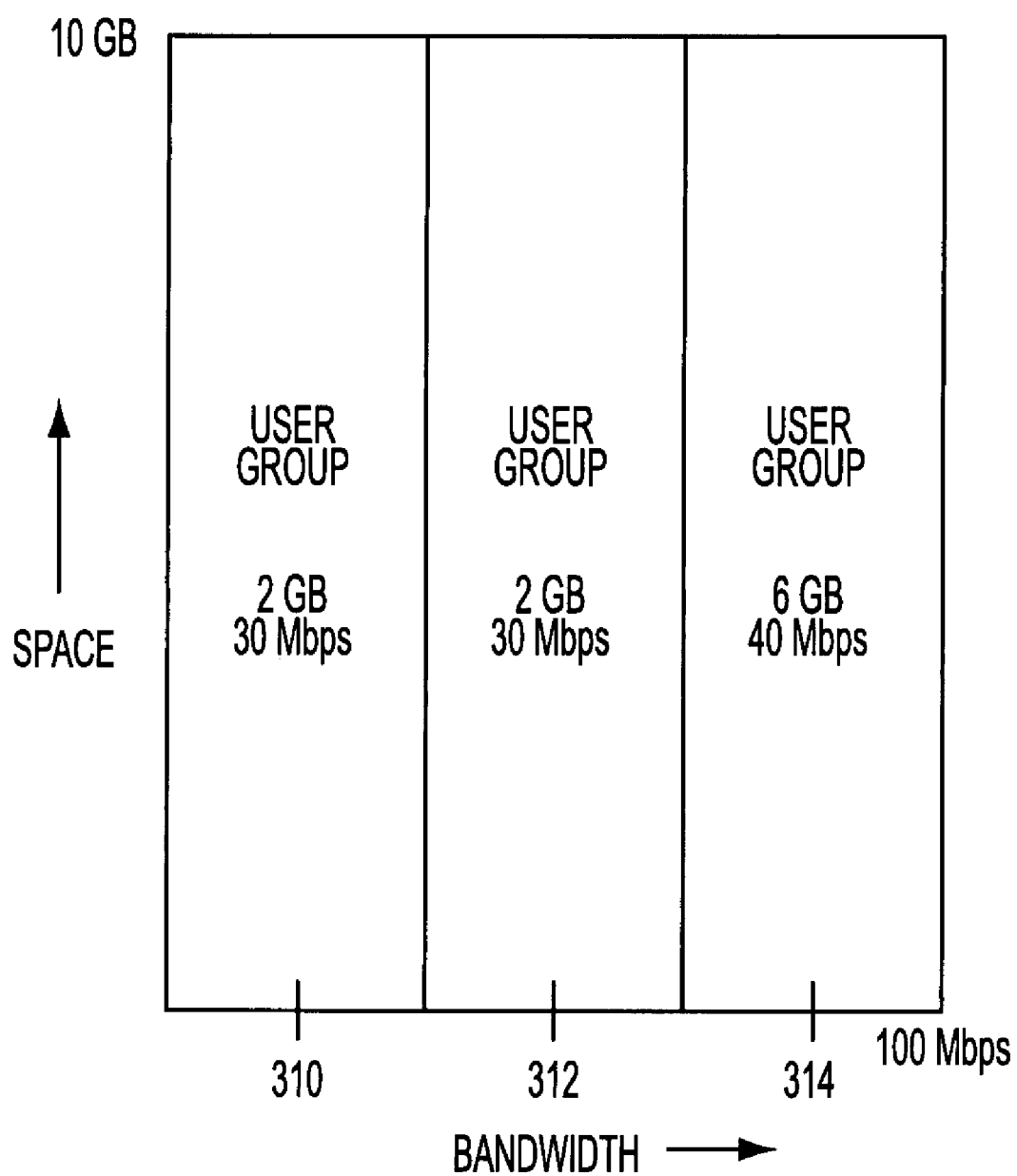
FIG. 6 is an illustration of an embodiment of the present invention as used to partition media assets between groups of users according to an embodiment of the invention.

Directing attention to FIG. 6, an embodiment of the present invention can also be used to partition file system resources between groups of users. In a server having a file system bandwidth of for example 100 Mbps and 10 GB of storage for media assets, asset groups can be used to partition file system resources, with each asset group designated for access to a particular user group. In this example, asset group 310 is assigned to a first user group and has 2 GB of storage and a bandwidth of 30 Mbps, asset group 312 is assigned to a second user group and has 2 GB of storage and a bandwidth of 30 Mbps, and asset group 314 is assigned to a third user group and has 6 GB of storage and a bandwidth of 40 Mbps. Using some primitives, such as authorization, authentication and accounting products, available from Portal Software in Cupertino, Calif., it is possible to provide tracking, billing, monitoring, and other services for all asset groups.

Figure 7:
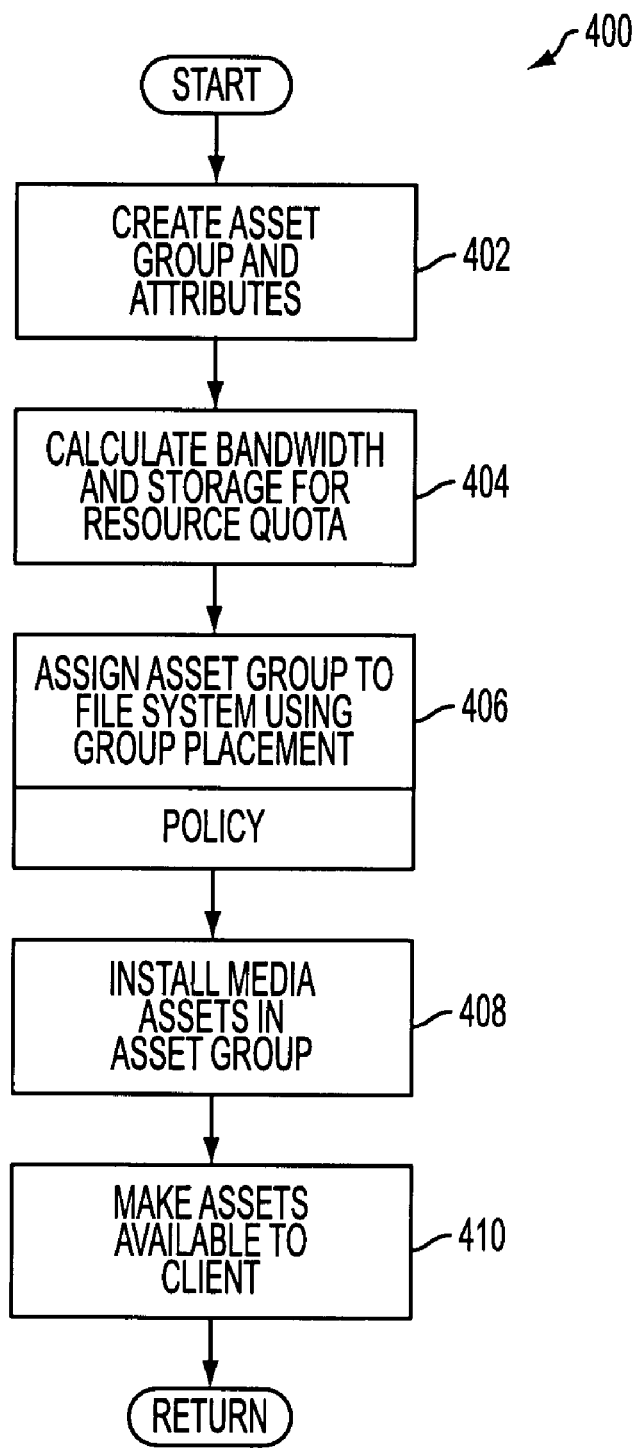
FIG. 7 is a flow chart diagram illustrating the sequence of operations executed to perform a method of an embodiment of the present invention.

Directing attention to FIG. 7, the method 400 of the present invention to create asset group 114 is performed through the following sequence of steps. At step 402, asset group 114 is created, including attributes Maximum Simultaneous Playouts for Asset Group (118), Maximum Bit Rate of the Assets Installed in Asset Group (120), Default Guaranteed Possible Playouts (122), and Resource Quota (126). Creating the asset group 114 can be performed by defining a data structure that contains a list of pointers that contain values indicating the storage locations of the media assets stored in the asset group, as well as pointers to values of the attributes or simply the attribute values themselves rather than pointers. At step 404, the storage bandwidth component of the Resource Quota is calculated by multiplying together the Maximum Simultaneous Playouts for Asset Group (118), Maximum Bit Rate (120), Default Guaranteed Possible Playouts (DGPP) (122). At step 406, the asset group 114 is assigned to a file system 112 maintained on server 102. At step 410, media assets (including media asset 110) are stored in accordance with the asset group 114 and made available to client computer 104.

Having disclosed exemplary embodiments and the best mode, modifications and variations may be made to the disclosed embodiments while remaining within the scope of the present invention as defined by the following claims.

We claim:

1. A method for administering storage space and storage bandwidth of media assets stored on a server computer system, the method comprising:
    creating an asset group, comprising:
        defining a data structure that contains a list of pointers indicating storage locations of media assets stored in the asset group and values of attributes associated with the asset group;
        determining a storage bandwidth requirement by calculating the attribute values;
        assigning the asset group to a file system;
        storing media assets in accordance with the asset group;
        specifying a maximum simultaneous playouts for asset group attribute, a maximum bit rate of the assets installed in asset group attribute, a guaranteed possible playouts attribute, and a resource quota attribute;
        calculating the storage bandwidth component of the resource quota by multiplying together a maximum simultaneous playouts attribute, a maximum bit rate attribute, and a default guaranteed possible playouts attribute (DGPP);
        assigning the asset group to the file system maintained on the server;
        storing the media asset(s) in accordance with the asset group; and
        defining a data structure that includes a list of pointers that contain values indicating the storage locations of the media assets stored in the asset group, as well as either pointers to values of the attributes or the attribute values themselves rather than pointers or a combination of the pointers and actual values
    the asset group providing shared storage space and storage bandwidth on a server computer system for media assets, the server computer system capable of connection to a computer network and communicating with a client computer system over the computer network;
    calculating a resource quota, the resource quota specifying storage space and storage bandwidth available to the asset group;
    assigning the asset group to at least one file system, comprising placing the asset group in a single file system without replicating media assets;
    installing at least one media asset in the asset group; and
    making the media asset available for transmission to the client computer system over the computer network.

2. The method of claim 1, wherein calculating a resource quota comprises multiplying a value representing a maximum bit rate at which a media asset in the asset group may be played by a value representing a maximum number of assets in the asset group that may be played simultaneously.

3. The method of claim 2, wherein installing assets comprises evaluating bandwidth for the media asset to determine in select an asset group in the media asset is placed.

4. The method of claim 3, wherein the step of installing comprises associating metadata with a media asset.

5. The method of claim 4, wherein the step of installing comprises copying the media asset into a storage location.

6. The method of claim 4, further comprising distributing the at least one media asset, from the server computer at one or more client computers, by sending the at least one media asset and the associated metadata from the server computer to the one or more client computers preconfigured to accept the media asset.

7. The method of claim 1 where in the client computer is defined as an edge server computer.

8. A computer program product stored on a non-transitory computer readable media and containing instructions, which, when executed by a computer, administers storage space and storage bandwidth of media assets stored on a server computer system, by:
    creating an asset group, comprising:
        defining a data structure that contains a list of pointers indicating storage locations of media assets stored in the asset group and values of attributes associated with the asset group;
        determining a storage bandwidth requirement by calculating the attribute values;
        assigning the asset group to a file system;
        storing media assets in accordance with the asset group;
        specifying a maximum simultaneous playouts for asset group attribute, a maximum bit rate of the assets installed in asset group attribute, a guaranteed possible playouts attribute, and a resource quota attribute;
        calculating the storage bandwidth component of the resource quota by multiplying together a maximum simultaneous playouts attribute, a maximum bit rate attribute, and a default guaranteed possible playouts attribute (DGPP);
        assigning the asset group to the file system maintained on the server;
        storing the media asset(s) in accordance with the asset group; and
        defining a data structure that includes a list of pointers that contain values indicating the storage locations of the media assets stored in the asset group, as well as either pointers to values of the attributes or the attribute values themselves rather than pointers or a combination of the pointers and actual values,
    the asset group providing shared storage space and storage bandwidth on a server computer system for media assets, the server computer system capable of connection to a computer network and playing the media assets to a client computer system over the computer network;

calculating a resource quota, the resource quota specifying storage space and storage bandwidth available to the asset group;

assigning the asset group to at least one file system, comprising placing the asset group in a single file system without replicating media assets;

installing at least one media asset in the asset group; and making the media asset available for transmission to the client computer system over the computer network.

9. The computer program product of claim 8, wherein calculating a resource quota comprises multiplying a value representing a maximum bit rate at which a media asset in the asset group may be played by a value representing a maximum number of assets in the asset group that may be played simultaneously.

10. The computer program product of claim 9, wherein installing assets comprises evaluating bandwidth for the media asset to determine in select an asset group in the media asset is placed.

11. The computer program product of claim 10, wherein the step of installing comprises associating metadata with a media asset.

12. The computer program product of claim 11, wherein the step of installing comprises copying the media asset into a storage location.

13. The computer program product of claim 12 further comprising distributing of the at least one media asset, from the server computer at one or more client computers, by sending the at least one media asset and the associated metadata from the server computer to the one or more client computers preconfigured to accept the media asset.

14. The computer program product of claim 13 where in the client computer is defined as an edge server computer.

* * * * *